US008864929B2

(12) United States Patent
Aramaki et al.

(10) Patent No.: US 8,864,929 B2

(45) Date of Patent: Oct. 21, 2014

(54) METHOD FOR MANUFACTURING LAMINATED SOFT-MAGNETIC SHEET

(75) Inventors: Keisuke Aramaki, Tochigi (JP); Junichiro Sugita, Tochigi (JP); Morio Sekiguchi, Tochigi (JP)

(73) Assignee: Dexerials Corporation, Tokyo (JP)

( * ) Notice: Subject to any disclaimer, the term of this patent is extended or adjusted under 35 U.S.C. 154(b) by 241 days.

(21) Appl. No.: 12/227,360

(22) PCT Filed: Oct. 4, 2007

(86) PCT No.: PCT/JP2007/069435

§ 371 (c)(1), (2), (4) Date: Nov. 14, 2008

(87) PCT Pub. No.: WO2008/053662

PCT Pub. Date: May 8, 2008

(65) Prior Publication Data

US 2009/0110587 A1 Apr. 30, 2009

(30) Foreign Application Priority Data

Oct. 31, 2006 (JP) ................................ 2006-295289

(51) Int. Cl.

| | |
|---|---|
| ***B29C 39/20*** | (2006.01) |
| ***B29C 47/00*** | (2006.01) |
| ***B22F 3/22*** | (2006.01) |
| ***B22F 1/00*** | (2006.01) |
| ***C22C 33/02*** | (2006.01) |
| ***B22F 7/02*** | (2006.01) |
| ***H01F 1/26*** | (2006.01) |
| *B22F 3/14* | (2006.01) |
| *H01F 1/147* | (2006.01) |
| *H01F 41/02* | (2006.01) |

(52) U.S. Cl.

CPC ............... *H01F 1/26* (2013.01); *B22F 2998/10* (2013.01); *B22F 2003/145* (2013.01); *B22F 3/22* (2013.01); *B22F 1/0055* (2013.01); *C22C 33/02* (2013.01); *H01F 1/14766* (2013.01); *B22F 1/0074* (2013.01); *B22F 7/02* (2013.01); *H01F 41/0233* (2013.01); *C22C 2202/02* (2013.01)

USPC ......................... 156/246; 156/312; 428/692.1

(58) Field of Classification Search

USPC ............... 156/311, 312, 246, 323; 428/692.1, 428/693.1, FOR. 171

See application file for complete search history.

(56) References Cited

U.S. PATENT DOCUMENTS

| | | | | |
|---|---|---|---|---|
| 2,523,966 A * | 9/1950 | Nicholson | ..................... | 156/312 |
| 4,876,139 A * | 10/1989 | Yamamoto et al. | ........... | 428/200 |

(Continued)

FOREIGN PATENT DOCUMENTS

| | | |
|---|---|---|
| JP | 03201415 A * | 9/1991 |
| JP | A-2000-101284 | 4/2000 |

(Continued)

OTHER PUBLICATIONS

Machine translation of Japanese Patent Publication No. JP-2006-278433A, originally published Oct. 12, 2006, 8 pages.*

*Primary Examiner* — William Bell

(74) *Attorney, Agent, or Firm* — Oliff PLC

(57) ABSTRACT

A method for producing a laminated soft-magnetic sheet including: laminating at least two curable soft-magnetic sheets obtained by applying a soft-magnetic composition, which contains a flat soft-magnetic powder, to a release base; and drying the soft-magnetic composition at a temperature T1 at which curing reaction does not substantially take place, compressing the laminate at a temperature T2 at which the curing reaction does not substantially take place, using a laminator for applying a linear pressure thereon while the linear pressure is sequentially changed, and by applying surface pressure, compressing the compressed laminate at a temperature T3 at which the curing reaction takes place.

13 Claims, 5 Drawing Sheets

(56) References Cited

U.S. PATENT DOCUMENTS

| | | | | |
|---|---|---|---|---|
| 5,213,903 | A * | 5/1993 | Kawamura et al. | 428/623 |
| 5,916,515 | A * | 6/1999 | Bryan et al. | 29/623.3 |
| 6,143,409 | A * | 11/2000 | Komoto et al. | 428/355 R |
| 2002/0039667 | A1* | 4/2002 | Takaya et al. | 428/692 |
| 2002/0084001 | A1* | 7/2002 | Iwasaki et al. | 148/105 |
| 2003/0108710 | A1* | 6/2003 | Coyle et al. | 428/64.4 |
| 2004/0041121 | A1* | 3/2004 | Yoshida et al. | 252/62 |
| 2005/0003079 | A1* | 1/2005 | Wakayama et al. | 427/129 |
| 2005/0089708 | A1* | 4/2005 | Maruko et al. | 428/611 |
| 2005/0150589 | A1* | 7/2005 | Amos et al. | 156/209 |
| 2006/0002749 | A1* | 1/2006 | Suzuki et al. | 399/328 |
| 2006/0214132 | A1* | 9/2006 | Hirata et al. | 252/62.54 |
| 2006/0237864 | A1* | 10/2006 | Morita et al. | 264/1.34 |
| 2008/0258119 | A1* | 10/2008 | Kobayashi et al. | 252/600 |

FOREIGN PATENT DOCUMENTS

| | | | | |
|---|---|---|---|---|
| JP | A-2000-243615 | | | 9/2000 |
| JP | A-2003-229694 | | | 8/2003 |
| JP | A-2004-140322 | | | 5/2004 |
| JP | A-2006-073949 | | | 3/2006 |
| JP | A-2006-128649 | | | 5/2006 |
| JP | A-2006-202266 | | | 8/2006 |
| JP | 2006278433 | A | * | 10/2006 |
| WO | WO 2005101942 | A1 | * | 10/2005 |
| WO | WO 2006/059771 | A1 | | 6/2006 |
| WO | WO 2007025007 | A1 | * | 3/2007 |

* cited by examiner

METHOD FOR MANUFACTURING LAMINATED SOFT-MAGNETIC SHEET

TECHNICAL FIELD

The present invention relates to a method for manufacturing a soft-magnetic sheet characterized by excellent magnetic properties and a small change in the thickness.

BACKGROUND ART

Generally, soft-magnetic sheets used in various electronic devices are manufactured by a kneading-rolling method. In this method, a flat soft-magnetic powder, a rubber, and a binder such as chlorinated polyethylene are mixed in a predetermined ratio and are kneaded in a kneader. The obtained kneaded mixture is rolled to a predetermined thickness by, for example, calender rolls and, if necessary, is heated to cross-link the binder, whereby a single-layer soft-magnetic sheet is obtained. Advantageously, with this method, the soft-magnetic powder can be packed at high density and can be oriented in an in-plane direction by rolling, and the thickness of the sheet can be easily adjusted.

However, in the kneading-rolling method, strain is generated in the soft-magnetic powder during kneading, causing deterioration of the magnetic properties of the soft-magnetic powder itself. Therefore, disadvantageously, the soft-magnetic sheet cannot have a large magnetic permeability. In addition, the soft-magnetic sheet changes in a high-temperature environment or a high-temperature high-humidity environment so as to increase in sheet thickness, and the magnetic permeability is disadvantageously reduced.

Accordingly, an application method in which the soft-magnetic powder undergoes less strain is used instead of the kneading-rolling method to manufacture soft-magnetic sheets (Patent Document 1). In this method, a liquid composition for forming a soft-magnetic sheet which is composed of a flat soft-magnetic powder, a rubber, a resin, and a solvent is applied to a release base and is then dried, whereby a soft-magnetic sheet is obtained which exhibits a small change in sheet thickness even in a high temperature environment or in a high-temperature high-humidity environment.

Patent Document 1: Japanese Patent Application Laid-Open No. 2000-243615.

DISCLOSURE OF THE INVENTION

Problems to be Solved by the Invention

The application method is suitable for producing a soft-magnetic sheet having a relatively small thickness but is not suitable for manufacturing a soft-magnetic sheet having a relatively large thickness. This is because the application thickness tends to be non-uniform when the liquid composition is applied thick and because the sheet is difficult to dry. In view of the above, the present inventors have attempted to produce a soft-magnetic sheet of a laminated type by: blending a curable resin and a curing agent therefore with a liquid composition for forming a soft-magnetic sheet; producing a plurality of thin curable soft-magnetic sheets by the application method; subjecting the plurality of soft-magnetic sheets to temporary pressure bonding at a relatively low temperature; and subjecting the temporarily bonded sheets to final pressure bonding at a relatively high temperature. In the soft-magnetic sheet of the laminated type produced by laminating the thin soft-magnetic sheets produced by the application method, a change in sheet thickness of each thin soft-magnetic sheet is small. However, as in the relatively thick single-layer soft-magnetic sheet produced by the kneading-rolling method, the soft-magnetic sheet produced by the application method changes in a high-temperature environment or a high-temperature high-humidity environment so as to increase in sheet thickness, and the magnetic permeability is disadvantageously reduced.

The present invention has been made to solve the foregoing problems in the conventional technology. It is an object of the present invention to provide a method for manufacturing a laminated soft-magnetic sheet which includes a plurality of laminated thin soft-magnetic sheets produced by an application method and in which a change in sheet thickness is suppressed and variations in magnetic permeability are small.

Means for Solving the Problems

The present inventors have investigated the reason why the laminated soft-magnetic sheet produced by laminating thin soft-magnetic sheets formed by an application method changes in a high-temperature environment or a high-temperature high-humidity environment so as to increase in sheet thickness and therefore the magnetic permeability is reduced. Specifically, the following two possibilities have been investigated. A first possibility is that air is entrapped between the thin soft-magnetic sheets constituting the laminated soft-magnetic sheet and is expanded at high temperature to cause the increase in sheet thickness. A second possibility is that the stain generated in the flat soft-magnetic powder during thermal pressure bonding is relaxed at high temperatures. In this case, the resin portion constituting the sheet is contracted to cause the increase in sheet thickness.

First, the present inventors have assumed that the first possibility is the main reason and have applied relatively high pressure to the plurality of soft-magnetic sheets at the time of temporary pressure bonding. However, the present inventors have found that the change in sheet thickness is not negligible. Next, the present inventors have assumed that the second possibility is the main reason and have applied relatively low pressure to the plurality of soft-magnetic sheets at the time of temporary pressure bonding. However, the present inventors have found that the change in sheet thickness is not negligible also in this case.

Thus, the present inventors have recognized that the object of the present invention cannot be achieved by simply applying relatively high or low pressure to the sheets at the time of temporary pressure bonding. In view of this, the present inventors have used a specific soft-magnetic composition for forming a soft-magnetic sheet and have made detailed studies on heat and pressure application patterns to the laminate of the thin soft-magnetic sheets formed of the soft-magnetic composition. Consequently, the inventors have found that the above object can be achieved by subjecting the laminate to temporary pressure bonding under three levels (low, medium, and high) of linear pressure at a temperature at which heat curing does not proceed and subsequently subjecting the laminate to final pressure bonding under surface pressure at a temperature at which heat curing proceeds. Thus, the present invention has been completed.

Accordingly, the present invention provides a method for manufacturing a laminated soft-magnetic sheet, the method comprising the following steps (A) to (D):

(A) obtaining curable soft-magnetic sheets, each of the curable soft-magnetic sheets being produced by applying to a release base a soft-magnetic composition prepared by mixing at least a flat soft-magnetic powder, an acrylic rubber having a glycidyl group, an epoxy resin, a latent curing agent for the epoxy resin, and a solvent, drying the applied soft-magnetic composition at a temperature T1 at which curing reaction of the soft-magnetic composition does not substantially take place, and removing the release base;

(B) obtaining a laminate of the curable soft-magnetic sheets by laminating at least two of the curable soft-magnetic sheets;

(C) compressing the obtained laminate at a temperature T2 at which the curing reaction does not substantially take place, using a laminator for applying a linear pressure thereon while the linear pressure is sequentially changed from a linear pressure P1, to a linear pressure P2, and to a linear pressure P3 (wherein $P1<P2<P3$); and (D) obtaining a laminated soft-magnetic sheet by compressing the compressed laminate at a temperature T3 at which the curing reaction takes place, using a press for applying surface pressure thereon.

EFFECTS OF THE INVENTION

In the present invention, a specific soft-magnetic composition is used to form soft-magnetic sheets, and a laminate is formed from the formed thin soft-magnetic sheets. The laminate is subjected to temporary pressure bonding under specific heat and pressure application patterns, i.e., under three levels (low, medium, and high) of linear pressure at a temperature at which heat curing does not proceed. Subsequently, the laminate is subjected to final pressure bonding under surface pressure at a temperature at which heat curing proceeds. Accordingly, the change in sheet thickness can be suppressed even in a high temperature environment or a high-temperature high-humidity environment, and therefore the reduction in the magnetic permeability can be prevented.

BEST MODE FOR CARRYING OUT THE INVENTION

Figure 1:
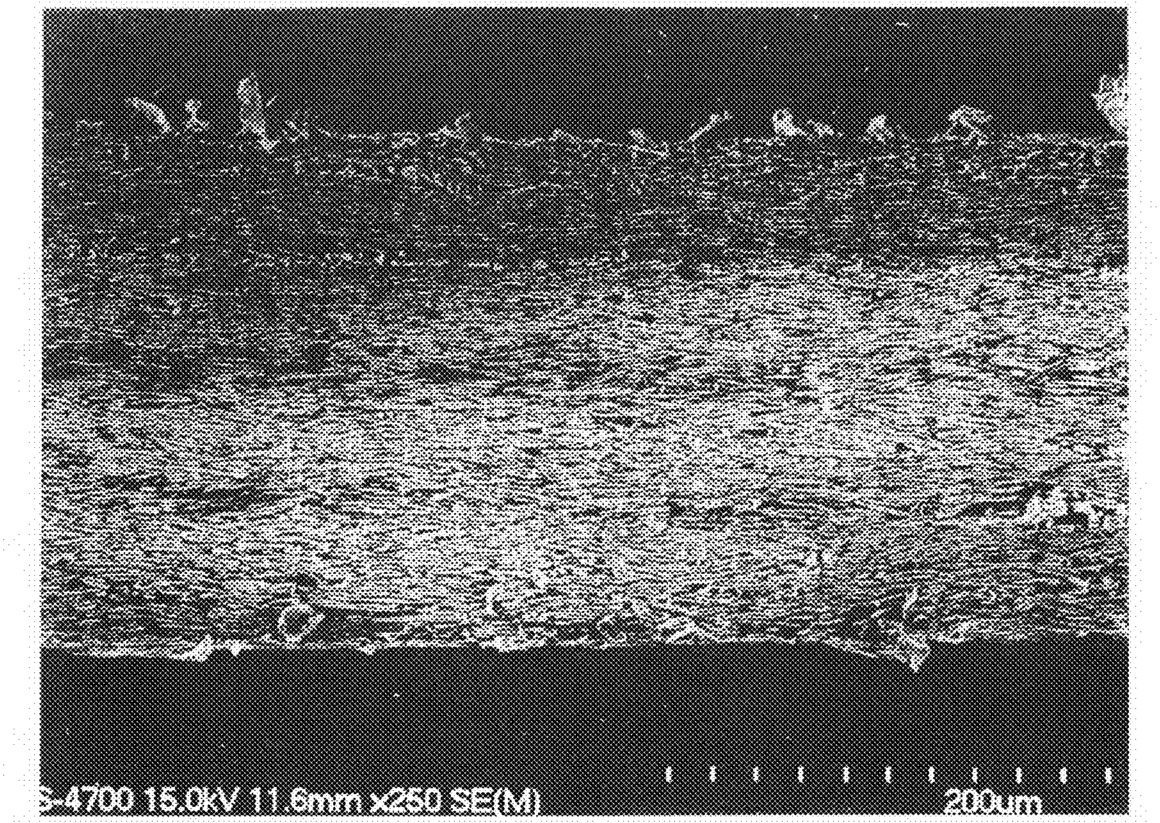
FIG. 1 is an electron microscope photograph of a cross-section of a laminated soft-magnetic sheet of Example 1.

The method for manufacturing a laminated soft-magnetic sheet in accordance with the present invention includes at least the following steps (A) to (D). A description will be given of each of the steps.

Step (A)

A soft-magnetic composition prepared by mixing at least a flat soft-magnetic powder, an acrylic rubber having a glycidyl group, an epoxy resin, a latent curing agent for the epoxy resin, and a solvent is applied to a release base. Subsequently, the applied soft-magnetic composition is dried at a temperature T1 at which the curing reaction of the soft-magnetic composition does not substantially take place, and the release base is removed, whereby a curable soft-magnetic sheet is obtained.

Any known method such as a doctor blade coating method or a comma coater coating method may be used as the method for applying the soft-magnetic composition to the release base. The application thickness may be appropriately determined according to the intended use of the curable soft-magnetic sheet and the number of sheets to be laminated. Normally, the soft-magnetic composition is applied so as to give a dry thickness of from 50 to 200 μm.

After applied to the release base, the soft-magnetic composition is dried, and the release base is removed, whereby the curable soft-magnetic sheet is obtained. In this case, the soft-magnetic composition is dried at the temperature T1 at which the curing reaction of the soft-magnetic composition does not substantially take place. The reason for drying the soft-magnetic composition at the temperature T1 at which the curing reaction does not substantially take place is that, as the curing reaction proceeds, the compressibility deteriorates and μ' does not increase. Moreover, when a soft-magnetic composition that has undergone the curing reaction is compressed, a change in thickness in a high-temperature high-humidity environment increases. As used herein, the phrase "the curing reaction does not substantially take place" is used to include not only the case in which the curing reaction does not take place at all but also the case in which the curing reaction is allowed to take place to a slight extent as long as the effects of the invention are not impaired. The phrase means that the soft-magnetic composition is uniformly subjected to the cross-linking reaction in the final step. Specific examples of the method for substantially preventing the curing reaction from taking place include a method in which the temperature T1 is set to a temperature at least 5° C. lower than the starting temperature of the curing reaction. The specific value of temperature T1 differs depending on the composition of the soft-magnetic composition and is typically 130° C. or lower. Any known method using a hot-air drying furnace, an electric heating furnace, an infrared heating furnace, and the like may be used as a specific method for drying.

A soft-magnetic powder having a flat shape (flat soft-magnetic powder) is used in the soft-magnetic composition. By arranging the flat soft-magnetic powder two-dimensionally in a plane, high magnetic permeability and high specific gravity can be achieved.

Any soft-magnetic alloy can be used as the raw material for the flat soft-magnetic powder. Examples of the soft-magnetic alloy include magnetic stainless steels (Fe—Cr—Al—Si alloys), sendusts (Fe—Si—Al alloys), permalloys (Fe—Ni alloys), silicon copper (Fe—Cu—Si alloys), Fe—Si alloys, Fe—Si—B(—Cu—Nb) alloys, Fe—Si—Cr—Ni alloys, Fe—Si—Cr alloys, Fe—Si—Al—Ni—Cr alloys, and ferrites. Of these, Fe—Si—Al alloys and Fe—Si—Cr—Ni alloys can be preferably used because of their magnetic properties.

When such a soft-magnetic alloy is used for RFID communications, it is preferable to employ a soft-magnetic alloy in which the real part μ' (magnetic permeability) of the complex relative magnetic permeability of the soft-magnetic alloy is relatively large and the imaginary part μ" (magnetic loss) thereof is relatively small. In this manner, the magnetic field emitted from an antenna coil for RFID communications is prevented from being converted to an eddy current by a metal body, so that the communications performance is improved.

Moreover, in order to reduce the value of μ" for the purpose of reducing eddy current loss, it is preferable to use a flat soft-magnetic alloy having a relatively large resistance. In this case, the resistance can be increased by changing the composition of the soft-magnetic alloy. For example, in a Fe—Si—Cr alloy, the amount of Si is preferably in the range of from 9 to 15 percent by weight.

A soft-magnetic powder having a flat shape is used as the flat soft-magnetic powder. The average particle size of the flat soft-magnetic powder is preferably in the range of from 3.5 to 90 μm, and the average thickness is preferably in the range of from 0.3 to 3.0 μm. The average particle size is more preferably in the range of from 10 to 50 μm, and the average thickness is more preferably in the range of from 0.5 to 2.5 μm. Therefore, the aspect ratio is preferably set to the range of from 8 to 80, and more preferably to the range of from 15 to 65. If necessary, the flat soft-magnetic powder is classified using a sieve or the like to make the size of the flat soft-magnetic powder uniform. In order to increase the magnetic permeability of the soft-magnetic material, it is effective to increase the particle size of the flat soft-magnetic powder to reduce the distances between the particles. It is also effective to increase the aspect ratio of the flat soft-magnetic powder to reduce the influence of a demagnetizing field in the soft-magnetic sheet.

The tap density and specific surface area (BET method) of the flat soft-magnetic powder are inversely proportional to each other. However, as the specific surface area increases, not only the value of μ' but also the value of μ", which should remain small, tend to increase. Therefore, these values are set within preferred ranges. Specifically, the tap density is preferably set to the range of from 0.55 to 1.45 g/ml, and more preferably to the range of from 0.65 to 1.40 g/ml. The specific surface area is preferably set to the range of from 0.40 to 1.20 $m^2/g$, and more preferably to the range of from 0.65 to 1.00 $m^2/g$.

For example, a soft-magnetic powder subjected to coupling treatment using a coupling agent such as a silane coupling agent may be used as the flat soft-magnetic powder. By using the soft-magnetic powder subjected to coupling treatment, the reinforcing effect on the interface between the flat soft-magnetic powder and the binder resin can be enhanced, and therefore the specific gravity and corrosion resistance can be improved. Examples of the coupling agent which can be used include γ-methacryloxypropyltrimethoxysilane, γ-glycidoxypropyltrimethoxysilane, and γ-glycidoxypropylmethyldiethoxysilane. The coupling treatment described above may be performed on the soft-magnetic powder in advance. Alternatively, when the flat soft-magnetic powder and the binder resin are mixed, the coupling agent may be added to the mixture at the same time to subject the mixture to coupling treatment.

When the amount of the flat soft-magnetic powder used in the soft-magnetic composition is too small, the intended magnetic properties are not obtained. When the amount is too large, the relative amount of the binder resin decreases, so that the moldability is impaired. Therefore, the amount of the flat soft-magnetic powder in the soft-magnetic composition except for the solvent is preferably in the range of from 70 to 90 percent by weight and more preferably in the range of from 80 to 85 percent by weight.

In order to impart good flexibility and heat resistance to the laminated soft-magnetic sheet, an acrylic rubber is used as the rubber component of the soft-magnetic composition. The acrylic rubber must have at least one glycidyl group in order to improve the compatibility with the epoxy resin. Specific examples of the acrylic rubber include EA-AN, BA-EA-AN, BA-AN, and BA-MMA.

When the amount of the acrylic rubber used in the soft-magnetic composition is too small, sufficient thermal processability is not obtained. When the amount is too large, the rubber elasticity is excessively large, and therefore the thermal processability deteriorates. Therefore, the amount of the acrylic rubber in the soft-magnetic composition except for the solvent is preferably in the range of from 9 to 16 percent by weight and more preferably in the range of from 12 to 14 percent by weight.

The epoxy resin is used in the soft-magnetic composition in order to impart good thermal processability and dimensional stability to the laminated soft-magnetic sheet. Specific examples of the epoxy resin include phenol novolac, tetraglycidylphenol, o-cresol novolac, tetraglycidylamine, bisphenol A, bisphenol F, and glycidyl ethers of bisphenol A.

When the amount of the epoxy resin used in the soft-magnetic composition is too small, sufficient thermal processability is not obtained. When the amount is too large, the flexibility is impaired. Therefore, the amount of epoxy resin in the soft-magnetic composition except for the solvent is preferably in the range of from 1.0 to 6.0 percent by weight and more preferably in the range of from 1.5 to 4.0 percent by weight.

The latent curing agent for the epoxy resin is used in the soft-magnetic composition in order to cure the epoxy resin. Specific examples of the latent curing agent for the epoxy resin include imidazole amines and polyamide phenolic acid anhydrides.

When the amount of the latent curing agent for the epoxy resin used in the soft-magnetic composition is too small, the reliability of the product decreases (the storage property decreases). When the amount is too large, the life of the coating and the life of the sheet decrease, and the cost increases. Therefore, the amount of the latent curing agent for the epoxy resin is preferably in the range of from 3 to 100 parts by weight and more preferably in the range of from 10 to 40 parts by weight with respect to 100 parts by weight of the epoxy resin.

An ordinary general purpose solvent can be used as the solvent. Examples of the general purpose solvent which can be used include: alcohols such as ethanol, n-propanol, isopropyl alcohol (IPA), and n-butyl alcohol; esters such as ethyl acetate and n-butyl acetate; ketones such as acetone, methyl ethyl ketone (MEK), methyl isobutyl ketone (MIBK), and cyclohexanone; ethers such as tetrahydrofuran (THF); cellosolves such as ethyl cellosolve, n-butyl cellosolve, and cellosolve acetate; and aromatic hydrocarbons such as toluene, xylene, and benzene. The amount used of the general purpose solvent can be appropriately selected according to the composition of the soft-magnetic composition, the method for application, and the like.

An ordinary release base can be used as the release base. Examples of the release base include a polyester sheet having a surface subjected to releasing treatment with silicone.

The soft-magnetic composition can be prepared by uniformly mixing the above components by any routine methods.

Step (B)

A laminate of curable soft-magnetic sheets was obtained by laminating at least two of the curable soft-magnetic sheets obtained in the step (A). The number of laminated sheets is determined according to the intended use of the laminated soft-magnetic sheet and the like. Preferably, release sheets are disposed on opposite sides of the laminate of the soft-magnetic sheets when the soft-magnetic sheets are laminated. In such a case, the above-mentioned polyester sheet subjected to releasing treatment with silicone can be used as the release sheets.

Step (C)

Next, the laminate obtained in the step (B) is compressed and subjected to temporary pressure bonding at a temperature T2 at which the curing reaction does not substantially take place using a laminator for applying linear pressure while the linear pressure is sequentially changed from P1, to P2, and to P3 (wherein P1<P2<P3). Advantageously, by subjecting the laminate to temporary pressure bonding in a manner described above, the occurrence of defective products caused by displacement of the sheets can be prevented, the reliability can be improved by degassing, and stretching can be prevented.

In this step, the reason for pressurizing the soft-magnetic sheets at the temperature T2 at which the curing reaction does not substantially take place is that the soft-magnetic composition is to be uniformly subjected to the cross-linking reaction while the surface pressure is applied to the soft-magnetic sheets. As in the case of the step (A), the phrase "the curing reaction does not substantially take place" is used to include not only the case in which the curing reaction does not take place at all but also the case in which the curing reaction is allowed to take place to a slight extent as long as the effects of the invention are not impaired. The phrase means that the soft-magnetic composition is uniformly subjected to the cross-linking reaction in the final step. Specific examples of the method for substantially preventing the curing reaction from taking place include a method in which the temperature T2 is set to a temperature at least 5° C. lower than the starting temperature of the curing reaction. The specific value of temperature T2 differs depending on the composition of the soft-magnetic composition forming the soft-magnetic sheet and is normally in the range of from 70 to 130° C. and preferably in the range of from 70 to 100° C. Any known method using a hot-air drying furnace, an electric heating furnace, an infrared heating furnace, and the like can be used as a specific method for heating.

The reason for applying the linear pressure using the laminator for applying the linear pressure is to prevent entrainment of air. The reason for gradually changing the applied linear pressure in three steps from a lower linear pressure to a higher linear pressure is to effectively degassing according to the softness and density of the sheets and to prevent displacement of the laminated sheets. Specific examples of the laminator include metal rolls, rubber rolls, and a combination of metal and rubber rolls serving as upper and lower rolls used in the laminator.

The specific values of P1, P2, and P3 differ depending on the material for the soft-magnetic sheet, the number of laminated sheets, and the like. The value of P1 is preferably in the range of from 2 to 10 kgf/cm, and more preferably in the range of from 3 to 8 kgf/cm. The value of P2 is preferably in the range of from 10 to 20 kgf/cm, and more preferably in the range of from 12 to 18 kgf/cm. The value of P3 is preferably in the range of from 20 to 50 kgf/cm, and more preferably in the range of from 25 to 45 kgf/cm.

In this step, when the line speed of the laminator is too fast, heat is not transferred well, and compression does not proceed. In addition to these, troubles such as application failure occur. When the line speed is too low, the productivity is impaired, and the cost increases. Therefore, the line speed is preferably in the range of from 0.1 to 5.0 m/min, and more preferably in the range of from 0.5 to 3.0 m/min.

Step (D)

Next, the compressed laminate obtained in the step (C) is compressed at a temperature T3 at which the curing reaction takes place, using a press for applying surface pressure. In this manner, the laminate is subjected to final pressure bonding while the soft-magnetic composition is cured, whereby the laminated soft-magnetic sheet of the present invention is obtained. In the obtained laminated soft-magnetic sheet, a change in sheet thickness is suppressed even in a high temperature environment or a high-temperature high-humidity environment. Accordingly, a reduction in magnetic permeability is prevented.

In this step, the reason for pressurizing the compressed laminate at the temperature T3 at which the curing reaction takes place is to allow the cross-linking reaction to proceed with the magnetic powder arranged in a plane. The specific value of temperature T3 differs depending on the composition of the soft-magnetic composition and is normally in the range of from 140 to 200° C. and preferably in the range of from 150 to 180° C. The reason for pressurizing with surface pressure is to allow cross-linking to proceed while the plane is uniformly pressurized. The value of the surface pressure differs depending on the material for the soft-magnetic sheets, the number of laminated sheets, and the like and is preferably in the range of from 10 to 60 kgf/cm$^2$ and more preferably in the range of from 15 to 40 kgf/cm$^2$.

In the laminated soft-magnetic sheet obtained by the above manufacturing method, a change in sheet thickness is suppressed, and variations in the magnetic permeability are small.

EXAMPLE

Hereinafter, the present invention is specifically described by way of Example.

Example 1

(Production of a Soft-Magnetic Sheet)

A soft-magnetic composition was prepared by mixing 550 parts by weight of a flat soft-magnetic powder (Fe—Si—Cr—Ni, product of MATE CO., LTD.), 83 parts by weight of an acrylic rubber having a glycidyl group (SG80H-3, product of Nagase ChemteX Corporation), 23.1 parts by weight of an epoxy resin (EPICOAT 1031S, product of Japan Epoxy Resins Co., Ltd.), 6.9 parts by weight of a latent curing agent for the epoxy resin (HX3748, product of Asahi Kasei Chemicals Corporation), 270 parts by weight of toluene, and 120 parts by weight of ethyl acetate. The cumulative particle sizes D (μm) of the flat soft-magnetic powder used were as follows: D10=9.4 μm; D50=23.9 μm; and D90=49.1 μm. In addition, the bulk density was 0.6 g/cc, and the tap density was 1.30 g/cc.

The obtained composition was applied to a release polyester (PET) base using a coater. Subsequently, the applied composition was dried at a temperature less than 80° C. and was further dried at 100° C., whereby a soft-magnetic sheet having a thickness of 100 μm was obtained on the release PET base.

(Production of a Laminate of the Soft-Magnetic Sheets)

The release PET base was released from the above-described soft-magnetic sheet to obtain a single-layer soft-magnetic sheet. A laminate was produced by laminating four of the obtained single-layer soft-magnetic sheets.

(Temporary Pressure Bonding of the Laminate of the Soft-Magnetic Sheets)

The obtained laminate was allowed to pass through a laminator (product of Sony Chemical & Information Device Corporation) in which the roll temperature was set to 70° C. Specifically, the laminate was subjected to temporary pressure bonding by allowing the laminate to pass through the laminator once at a line speed of 0.5 m/min and a linear pressure of 3.3 kgf/cm, twice at a linear pressure of 14.8 kgf/cm, and twice at a linear pressure of 29.54 kgf/cm.

(Production of a Laminated Soft-Magnetic Sheet)

Next, the temporarily pressure bonded laminate was compressed at 165° C. under a pressure of 24.9 kgf/cm$^2$ for 10 minutes in a vacuum press (product of KITAGAWA SEIKI Co., Ltd.), whereby a laminated soft-magnetic sheet of Example 1 was obtained. The cross-section of this laminated soft-magnetic sheet is shown in FIG. 1. As can be seen from FIG. 1, the magnetic powder was packed at high density and was arranged in an in-plane direction.

Comparative Example 1

(Production of a Soft-Magnetic Sheet)

As in Example 1, a soft-magnetic sheet having a thickness of 100 μm was obtained on the release PET base.

(Production of a Laminate of the Soft-Magnetic Sheets)

The release PET base was released from the above-described soft-magnetic sheet to obtain a single-layer soft-magnetic sheet. A laminate was produced by laminating four of the obtained single-layer soft-magnetic sheets.

(Temporary Pressure Bonding of the Laminate of the Soft-Magnetic Sheets)

The obtained laminate was allowed to pass through a laminator (product of Sony Chemical & Information Device Corporation) in which the roll temperature was set to 70° C. Specifically, the laminate was subjected to temporary pressure bonding by allowing the laminate to pass through the laminator five times at a line speed of 0.5 m/min and a linear pressure of 3.3 kgf/cm.

(Production of a Laminated Soft-Magnetic Sheet)

Figure 2:
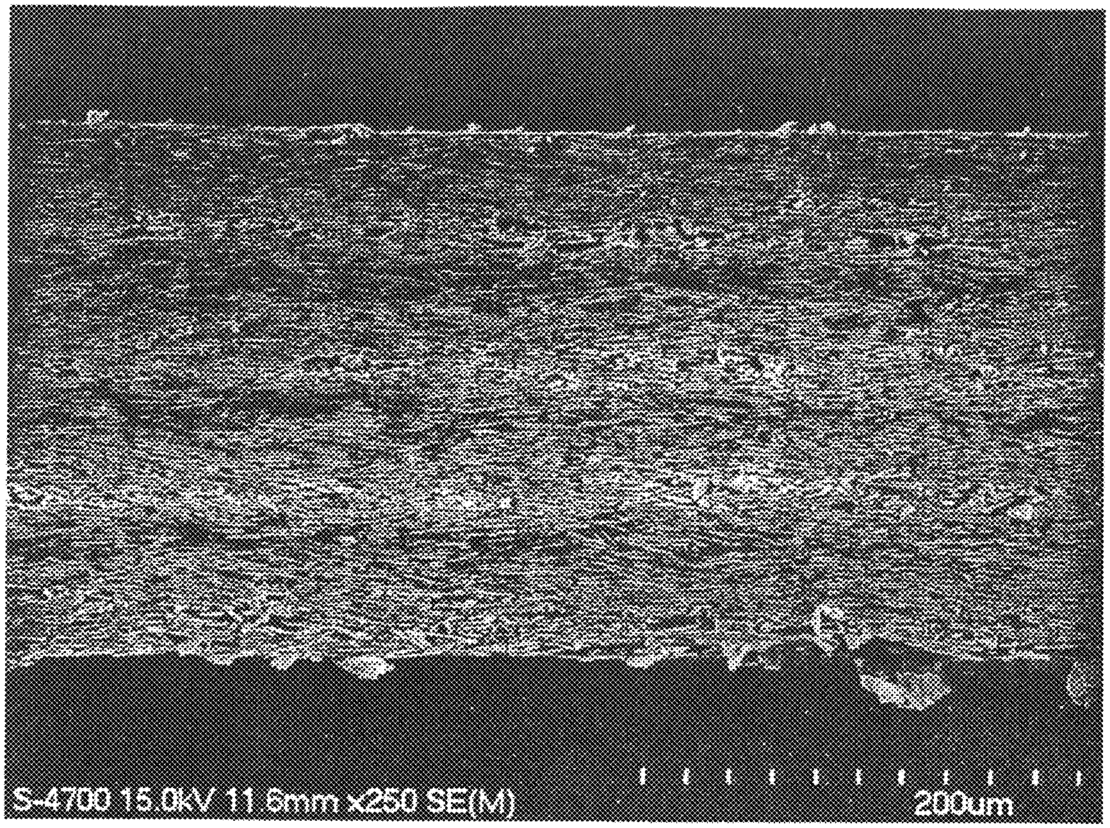
FIG. 2 is an electron microscope photograph of a cross-section of a laminated soft-magnetic sheet of Comparative Example 1.

Next, the temporarily pressure bonded laminate was compressed at a pressure of 24.9 kgf/cm$^2$ in a vacuum press (product of KITAGAWA SEIKI Co., Ltd.), whereby a laminated soft-magnetic sheet was obtained. The cross-section of this laminated soft-magnetic sheet is shown in FIG. 2. As can be seen from FIG. 2, a relatively large amount of voids were found at the lamination interfaces.

Comparative Example 2

(Production of a Soft-Magnetic Sheet)

As in Example 1, a soft-magnetic sheet having a thickness of 100 μm was obtained on the release PET base.

(Production of a Laminate of the Soft-Magnetic Sheets)

The release PET base was released from the above-described soft-magnetic sheet to obtain a single-layer soft-magnetic sheet. A laminate was produced by laminating four of the obtained single-layer soft-magnetic sheets.

(Temporary Pressure Bonding of the Laminate of the Soft-Magnetic Sheets)

The obtained laminate was allowed to pass through a laminator (product of Sony Chemical & Information Device Corporation) in which the roll temperature was set to 70° C. Specifically, the laminate was subjected to temporary pressure bonding by allowing the laminate to pass through the laminator five times at a line speed of 0.5 m/min and a linear pressure of 29.5 kgf/cm.

(Production of a Laminated Soft-Magnetic Sheet)

Figure 3:
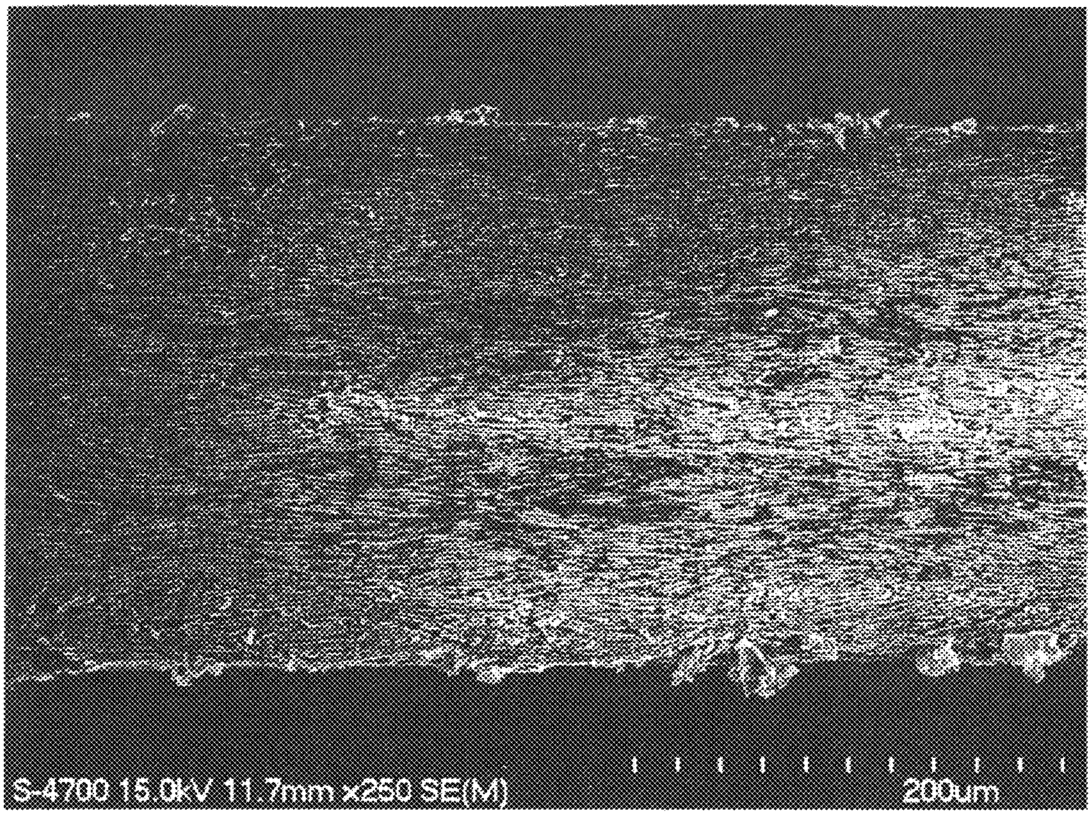
FIG. 3 is an electron microscope photograph of a cross-section of a laminated soft-magnetic sheet of Comparative Example 2.

Next, the temporarily pressure bonded laminate was compressed at a pressure of 24.9 kgf/cm$^2$ in a vacuum press (product of KITAGAWA SEIKI Co., Ltd.), whereby a laminated soft-magnetic sheet of Comparative Example 2 was obtained. The cross-section of this laminated soft-magnetic sheet is shown in FIG. 3. As can be seen from FIG. 3, the degree of orientation and density of the flat soft-magnetic powder were high in some areas and were low in some areas.

Comparative Example 3

(Production of a Soft-Magnetic Sheet)

As in Example 1, a soft-magnetic sheet having a thickness of 100 μm was obtained on the release PET base.

(Production of a Laminate of the Soft-Magnetic Sheets)

Figure 4:
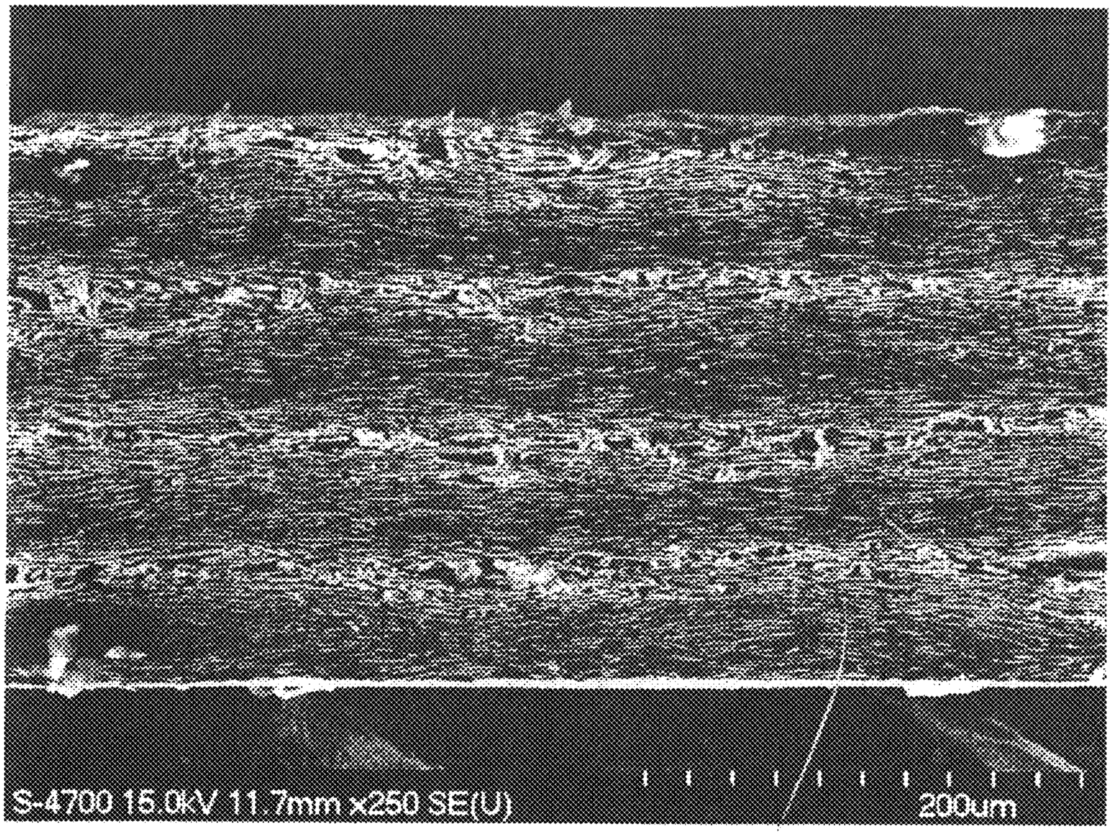
FIG. 4 is an electron microscope photograph of a cross-section of a laminated soft-magnetic sheet of Comparative Example 3.

The release PET base was released from the above-described soft-magnetic sheet to obtain a single-layer soft-magnetic sheet. A laminate was produced by laminating four of the obtained single-layer soft-magnetic sheets. The cross-section of the laminated soft-magnetic sheet is shown in FIG. 4. As can be seen from FIG. 4, a large number of voids (air) remained in the laminated soft-magnetic sheet.

(Production of a Laminated Soft-Magnetic Sheet)

Next, the laminate without temporary pressure bonding was compressed at a pressure of 24.9 kgf/cm$^2$ in a vacuum press (product of KITAGAWA SEIKI Co., Ltd.), whereby a laminated soft-magnetic sheet of Comparative Example 3 was obtained.

Comparative Example 4

(Production of a Soft-Magnetic Sheet)

As in Example 1, a soft-magnetic sheet having a thickness of 100 μm was obtained on the release PET base.

(Production of a Laminate of the Soft-Magnetic Sheets)

The release PET base was released from the above-described soft-magnetic sheet to obtain a single-layer soft-magnetic sheet. A laminate was produced by laminating four of the obtained single-layer soft-magnetic sheets.

(Production of a Laminated Soft-Magnetic Sheet)

Figure 5:
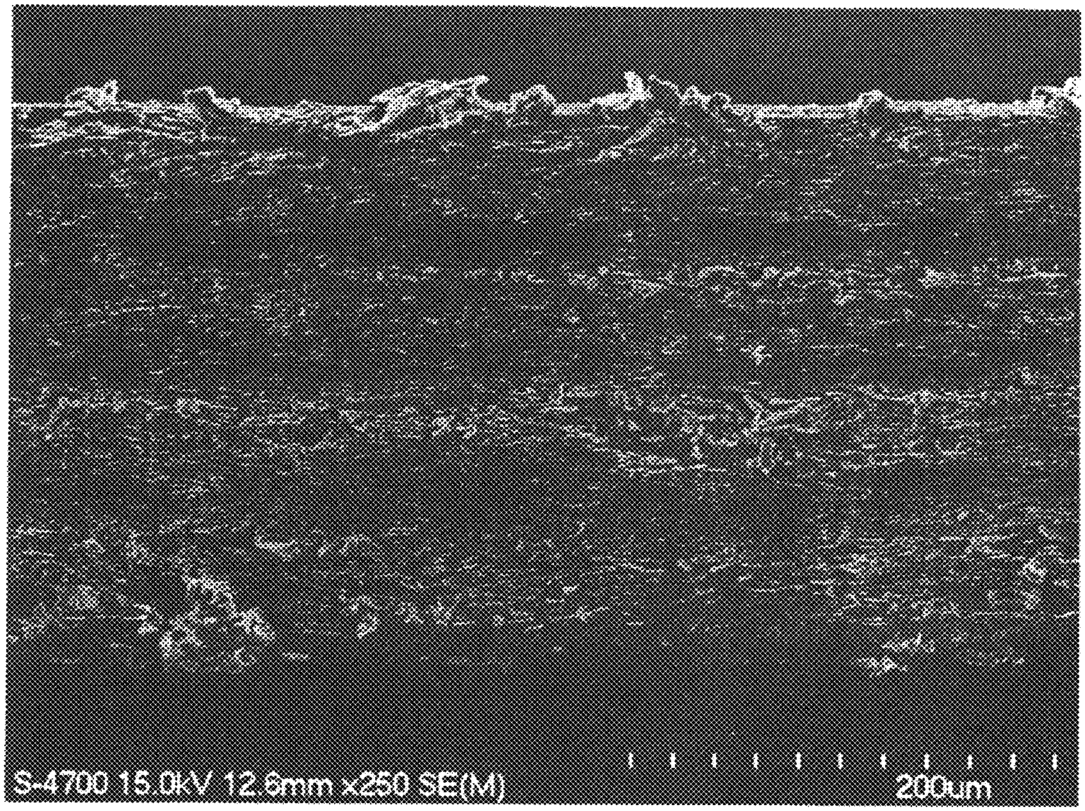
FIG. 5 is an electron microscope photograph of a cross-section of a laminated soft-magnetic sheet of Comparative Example 4.

Next, the laminate without temporary pressure bonding was compressed at a pressure of 37.4 kgf/cm$^2$ in a vacuum press (product of KITAGAWA SEIKI Co., Ltd.), whereby a laminated soft-magnetic sheet of Comparative Example 4 was obtained. The cross-section of this laminated soft-magnetic sheet is shown in FIG. 5. As can be seen from FIG. 5, high density regions and void (air) regions were clearly distinguished.

<Evaluation>

First, each of the obtained laminated soft-magnetic sheets was measured for the thickness (t1) and the magnetic permeability μ'. For practical purposes, the magnetic permeability is preferably 38 or more. After the soft-magnetic sheet was held in a high-temperature high-humidity environment of 85° C. and 60% Rh for 240 hours, the thickness (t2) of the soft-magnetic sheet was measured, and the ratio of change in thickness [(t1−t2)×100/t2] was computed. The ratio of change in thickness is preferably as close to 0 as possible (in Table 1, "G" represents that the ratio of change in thickness was less than 2.0, and "NG" represents that the ratio of change in thickness was 2.0 or more). Moreover, the ratio (%) of occurrence of sheet displacement was computed. Specifically, the ratio of the number of displaced laminated sheets to the number of produced sheets was computed. The results obtained are shown in Table 1.

TABLE 1

| | Ex. 1 | Comp. Ex. 1 | Comp. Ex. 2 | Comp. Ex. 3 | Comp. Ex. 4 |
|---|---|---|---|---|---|
| Laminator pressure | Stepwise | Constant | Constant | None | None |

TABLE 1-continued

| | Ex. 1 | Comp. Ex. 1 | Comp. Ex. 2 | Comp. Ex. 3 | Comp. Ex. 4 |
|---|---|---|---|---|---|
| 1st pass, 70° C. [kgf/cm] | 3.3 | 3.3 | 29.5 | — | — |
| 2nd, 3rd pass, 70° C. [kgf/cm] | 14.8 | 3.3 | 29.5 | — | — |
| 4th, 5th pass, 70° C. [kgf/cm] | 29.5 | 3.3 | 25.9 | — | — |
| Vacuum pressing pressure [kgf/cm$^2$] | 24.9 | 24.9 | 24.9 | 24.9 | 37.4 |
| Magnetic permeability μ' (13.56 MHz) | 41.6 | 39.7 | 24.3 | 39.6 | 41.4 |
| Ratio of change in thickness (%) | 1.70 | 3.20 | 2.80 | 3.80 | 3.60 |
| Evaluation | G | NG | NG | NG | NG |
| Ration of occurrence of sheet displacement | 0 | 0 | 24 | 0 | 0 |

As can be seen from Table 1, in the laminated soft-magnetic sheet of Example 1 that was produced by allowing the laminate of the soft-magnetic sheets to pass through the laminator under three different pressure conditions before vacuum pressing, the magnetic permeability μ' was made large. In addition, the change in thickness after 240 hours at 85° C. and 60 Rh % was suppressed to be as small as 2% or less. The observation of the cross-section of the soft-magnetic sheet showed that air was not entrapped and no lamination interface was found. The ratio of occurrence of defectives caused by lamination displacement of the sheets was 0% out of 50 laminated soft-magnetic sheets produced.

In the laminated soft-magnetic sheet of Comparative Example 1 that was produced by allowing the soft-magnetic sheets to pass through the laminator before vacuum pressing, the magnetic permeability μ' was made large. However, the change in sheet thickness after 240 hours at 85° C. and 60 Rh % was 3% or more, which is greater than that in Example 1. No sheet displacement was found in 50 produced sheets, and therefore the ratio of occurrence of defectives was 0%.

In the laminated soft-magnetic sheet of Comparative Example 2 that was produced by allowing the soft-magnetic sheet to pass through the laminator before vacuum pressing, the magnetic permeability μ' was made large. However, the change in sheet thickness after 240 hours at 85° C. and 60 Rh % was 2% or more, which is greater than that in Example 1. Sheet displacement was found in 12 produced sheets out of 50, and the ratio of occurrence of defectives was high.

The laminated soft-magnetic sheet of Comparative Example 3 was not allowed to pass through the laminator before compression in the vacuum press. Therefore, as shown in FIG. 4, gaps were generated at the interfaces between the single-layer soft-magnetic sheets constituting the laminated soft-magnetic sheet. The change in thickness after 240 hours at 85° C. and 60 Rh % was 2% or more, which is greater than that in Example 1. The ratio of occurrence of defectives caused by lamination displacement of the sheets was 0% out of 50 produced sheets.

In the laminated soft-magnetic sheet of Comparative Example 4 that was produced using high pressing pressure during vacuum pressing, the magnetic permeability μ' was as high as that in Example 1, and the gaps between lamination interfaces were small. However, since excessively high compression pressure was used, strain remained in the sheet. This may be one of the causes of the change in thickness in a high-temperature high-humidity environment. The change in thickness after 240 hours at 85° C. and 60 Rh % was 2% or more, which is greater than that in Example 1. Moreover, the ratio of occurrence of defectives caused by lamination displacement of the sheets was 0% out of 50 produced sheets.

INDUSTRIAL APPLICABILITY

In the manufacturing method of the present invention, a specific soft-magnetic composition is used to form soft-magnetic sheets, and a laminate is formed from the formed thin soft-magnetic sheets. The laminate is subjected to temporary pressure bonding under specific heat and pressure application patterns, i.e., under three levels (low, medium, and high) of linear pressure at a temperature at which heat curing does not proceed. Subsequently, the laminate is subjected to final pressure bonding under surface pressure at a temperature at which heat curing proceeds. Accordingly, a change in thickness of the laminated soft-magnetic sheet can be suppressed even in a high temperature environment or a high-temperature high-humidity environment, and therefore a reduction of the magnetic permeability can be prevented. The soft-magnetic sheet is useful as a magnetic flux concentrator for, for example, RFID systems such as noncontact IC cards and IC tags or for a general purpose radio wave absorber. Specifically, the soft-magnetic sheet is useful as a flexible shielding material for RFID and a noise wave absorber for electronic devices such as portable digital cameras.

The invention claimed is:

1. A method for manufacturing a laminated soft-magnetic sheet, the method comprising the following steps (A) to (D):

(A) obtaining curable soft-magnetic sheets, each of the curable soft-magnetic sheets being produced by applying to a release base a soft-magnetic composition prepared by mixing at least a flat soft-magnetic powder, the flat soft-magnetic powder having an average particle size in the range of 10 to 50 μm, an aspect ratio in the range of from 15 to 60 , a tap density in the range of from 0.65 to 1.40 g/mL, and a specific surface area in the range of from 0.65 to 1.00 m$^2$/g, an acrylic rubber having a glycidyl group, an epoxy resin, a latent curing agent for the epoxy resin, and a solvent, drying the applied soft-magnetic composition at a temperature T1 at which curing reaction of the soft-magnetic composition does not substantially take place, and removing the release base, wherein the amount of the flat soft-magnetic powder in the soft-magnetic composition except for the solvent is in the range of from 70 to 90 percent by weight, the amount of the acrylic rubber in the soft-magnetic composition except for the solvent is in the range of from 9 to 16 percent by weight, the amount of epoxy resin in the soft-magnetic composition except for the solvent is in the range of from 1.0 to 6.0 percent by weight, the amount of the latent curing agent for the epoxy resin is in the range of from 3 to 100 parts by weight with respect to 100 parts by weight of the epoxy resin, and the temperature T1 is in the range of from 50 to 90 ° C.;

(B) obtaining a laminate of the curable soft-magnetic sheets by laminating at least two of the curable soft-magnetic sheets;

(C) compressing the obtained laminate at a temperature T2 at which the curing reaction does not substantially take place, using a laminator for applying a linear pressure thereon while the linear pressure is sequentially changed from a linear pressure P1 , to a linear pressure P2, and to a linear pressure P3 (wherein P1 <P2 <P3 ), wherein the temperature T2 is in the range of from 70 to 130 ° C., the linear pressure P1 is in the range of from 2 to 10 kgf/cm, the linear pressure P2 is in the range of from 10 to 20 kgf/cm, and the linear pressure P3 is in the range of from 20 to 50 kgf/cm; and (D) after step (C), obtaining a laminated soft-magnetic sheet by compressing the compressed laminate at a temperature T3 at which the curing reaction takes place, using a press for applying surface pressure thereon, wherein the temperature T3 is in the range of from 140 to 200 ° C., and the surface pressure is in the range of from 10 to 60 kgf/cm$^2$ , and each of the curable soft magnetic sheets in the compressed laminate are in direct contact with each adjacent curable soft magnetic sheet.

2. The manufacturing method according to claim 1, wherein a line speed of the laminator in the step (C) is in the range of from 0.1 to 5 m/min.

3. The manufacturing method according to claim 1, wherein the flat soft-magnetic powder is a powder of a soft-magnetic alloy of Fe—Si—Cr, the amount of Si in the Fe—Si—Cr alloy being from 9 to 15 percent by weight.

4. The manufacturing method according to claim 1, wherein the laminated soft-magnetic sheet has a ratio in change in thickness of less than 2.0 .

5. The manufacturing method according to claim 1, wherein the compressing the obtained laminate at a temperature T2 in step (C) takes place in a hot-air drying furnace, an electric heating furnace, or an infrared heating furnace, and the furnace provides the compressing temperature T2.

6. The manufacturing method according to claim 1, wherein the amount of the flat soft-magnetic powder in the soft-magnetic composition except for the solvent is in the range of from 80 to 85 percent by weight.

7. The manufacturing method according to claim 1, wherein the amount of the acrylic rubber in the soft-magnetic composition except for the solvent is in the range of from 12 to 14 percent by weight.

8. The manufacturing method according to claim 1, wherein the amount of epoxy resin in the soft-magnetic composition except for the solvent is in the range of from 1.5 to 4.0 percent by weight.

9. The manufacturing method according to claim 1, wherein the amount of the latent curing agent for the epoxy resin is in the range of from 10 to 40 parts by weight with respect to 100 parts by weight of the epoxy resin.

10. The manufacturing method according to claim 1, wherein the linear pressure P1 is in the range of from 3 to 8 kgf/cm.

11. The manufacturing method according to claim 1, wherein the linear pressure P2 is in the range of from 12 to 18 kgf/cm.

12. The manufacturing method according to claim 1, wherein the linear pressure P3 is in the range of from 25 to 45kgf/cm.

13. The manufacturing method according to claim 1, wherein the surface pressure is from 15to 40 kgf/cm$^2$.

* * * * *